United States Patent [19]
Ezell

[11] Patent Number: 5,731,736
[45] Date of Patent: Mar. 24, 1998

[54] CHARGE PUMP FOR DIGITAL POTENTIOMETERS

[75] Inventor: Richard William Ezell, Carrollton, Tex.

[73] Assignee: Dallas Semiconductor, Dallas, Tex.

[21] Appl. No.: 710,826

[22] Filed: Sep. 23, 1996

Related U.S. Application Data

[63] Continuation of Ser. No. 497,042, Jun. 30, 1995, abandoned.

[51] Int. Cl.$^6$ ................................................ G05F 1/10
[52] U.S. Cl. .................... 327/536; 327/544; 327/538; 327/558
[58] Field of Search ............................ 327/551, 555, 327/558, 536, 537, 323, 309, 544, 538, 557

[56] References Cited

U.S. PATENT DOCUMENTS

| | | | |
|---|---|---|---|
| 4,439,692 | 3/1984 | Beekmans et al. | 327/536 |
| 4,551,705 | 11/1985 | Anderson | 340/347 DA |
| 4,581,546 | 4/1986 | Allan | 307/297 |
| 4,617,652 | 10/1986 | Simko | 365/203 |
| 4,631,421 | 12/1986 | Inoue et al. | 307/297 |
| 4,745,372 | 5/1988 | Miwa | 331/8 |
| 4,794,278 | 12/1988 | Vajdic | 307/297 |
| 4,810,949 | 3/1989 | Schiemenz et al. | 327/309 |
| 4,814,640 | 3/1989 | Miyake | 307/303 |
| 4,816,642 | 3/1989 | Dennison | 327/309 |
| 4,820,936 | 4/1989 | Veendrick et al. | 307/296.2 |
| 4,850,000 | 7/1989 | Dias | 377/54 |
| 4,952,889 | 8/1990 | Irwin et al. | 332/128 |
| 5,065,132 | 11/1991 | Taddiken et al. | 338/334 |
| 5,179,535 | 1/1993 | Nakayama | 365/189.09 |
| 5,243,535 | 9/1993 | Bolan et al. | 364/482 |
| 5,268,871 | 12/1993 | Dhong et al. | 365/226 |
| 5,303,190 | 4/1994 | Pelley | 365/189.11 |
| 5,339,050 | 8/1994 | Llewellyn | 331/16 |
| 5,359,552 | 10/1994 | Dhong et al. | 365/189.09 |
| 5,365,195 | 11/1994 | Kageyama | 327/551 |
| 5,376,840 | 12/1994 | Nakayama | 327/537 |
| 5,382,922 | 1/1995 | Gersbach et al. | 331/1 A |
| 5,394,026 | 2/1995 | Yu et al. | 327/536 |
| 5,426,334 | 6/1995 | Skovmand | 327/427 |
| 5,499,183 | 3/1996 | Kobatake | 327/536 |
| 5,581,455 | 12/1996 | Rossi et al. | 327/536 |

OTHER PUBLICATIONS

Dallas Semiconductor Corporation, *System Extension Data Book*, "DS1802, Dual Audio Taper Potentiometer with Push-button Control," 1994–1995, pp. 217–230.

*Primary Examiner*—Timothy P. Callahan
*Assistant Examiner*—Jung Ho Kim
*Attorney, Agent, or Firm*—Jenkins & Gilchrist

[57] ABSTRACT

A voltage bias generating circuit is disclosed which comprises a voltage-controlled charge pump which operates at a high frequency relative to audio frequencies wherein a plurality of low pass filters are used to prevent the introduction of noise and distortion of audio signals being amplified through a digital potentiometer or resistor array.

14 Claims, 4 Drawing Sheets

CHARGE PUMP FOR DIGITAL POTENTIOMETERS

This application is a continuation of application Ser. No. 08/497,042, filed on Jun. 30, 1995, which was abandoned upon the filing hereof.

BACKGROUND OF THE INVENTION

1. Technical Field of the Invention

The present invention relates generally to circuits which produce resistance and, more particularly, to integrated circuits which provide a selectable resistance value between two external terminals thereof.

2. Description of Related Art

Traditional potentiometers are mechanical devices whose resistance varies according to a selected physical position of a wiper. Digital potentiometers, however, are semiconductor devices designed to operate in a manner similar to a potentiometer although the device is notably different. Specifically, digital potentiometers are comprised of a resister array with a plurality of selectable wiper points. For each selectable wiper point, there is a semiconductor gate device for switching a signal path through the gate device and into the resistor array at the specified wiper point.

One notable aspect, however, of such a design is that the semiconductor gate devices usually require a threshold voltage potential in order to perform the gate function, namely, to allow a signal to flow from a preselected wiper point. A shortcoming, however, is that digital potentiometers frequently operate at very low voltages. Therefore, once a threshold voltage for a gate device has been reached, the voltage potential left for the signal itself may be lower than desired. In other words, the gate device is introducing an additional load above and beyond the selected load in the digital potentiometer which therefore affects the signal processing adversely.

This problem has been addressed by the prior art. For example, U.S. Pat. No. 5,179,535 issued to Nakayama discloses a substrate bias voltage generating circuit. Similarly, U.S. Pat. No. 4,820,936 issued to Veendrick, et al, discloses a substrate bias voltage generator for an integrated CMOS circuit. A problem, however, with such charge pumps, is that they are known to introduce frequency components into the signal being amplified. If the amplification device is, for example, an audio circuit, then the frequency components added by a substrate bias voltage generator are likely to introduce noise and distort the signal being amplified. This noise is eventually transmitted to the speaker. Thus, what is needed, is a bias voltage generator especially adapted for supplying a threshold voltage for the various gate devices in a digital potentiometer which does not introduce additional frequency components in the audio range or otherwise distort the signal.

SUMMARY OF THE INVENTION

A charge pump, comprised of a capacitor bank which increases voltage and acts as a current source is regulated in a manner which consumes a minimal amount of power and which is placed in a feedback loop of a bias voltage generating circuit and which is operated at frequencies well above audio frequencies. This facilitates the filtering of any high frequency components introduced by the charge pump. Several different low pass filters are placed between the charge pump and the gate device so as to filter the high frequency components and to prevent the introduction of noise to the amplified signal.

BRIEF DESCRIPTION OF THE DRAWINGS

Other advantages and novel features of the present invention will become apparent from the following detailed description of the invention when considered in conjunction with the accompanying drawings in which.

DETAILED DESCRIPTION OF THE PRESENTLY PREFERRED EXEMPLARY EMBODIMENTS

Figure 1:
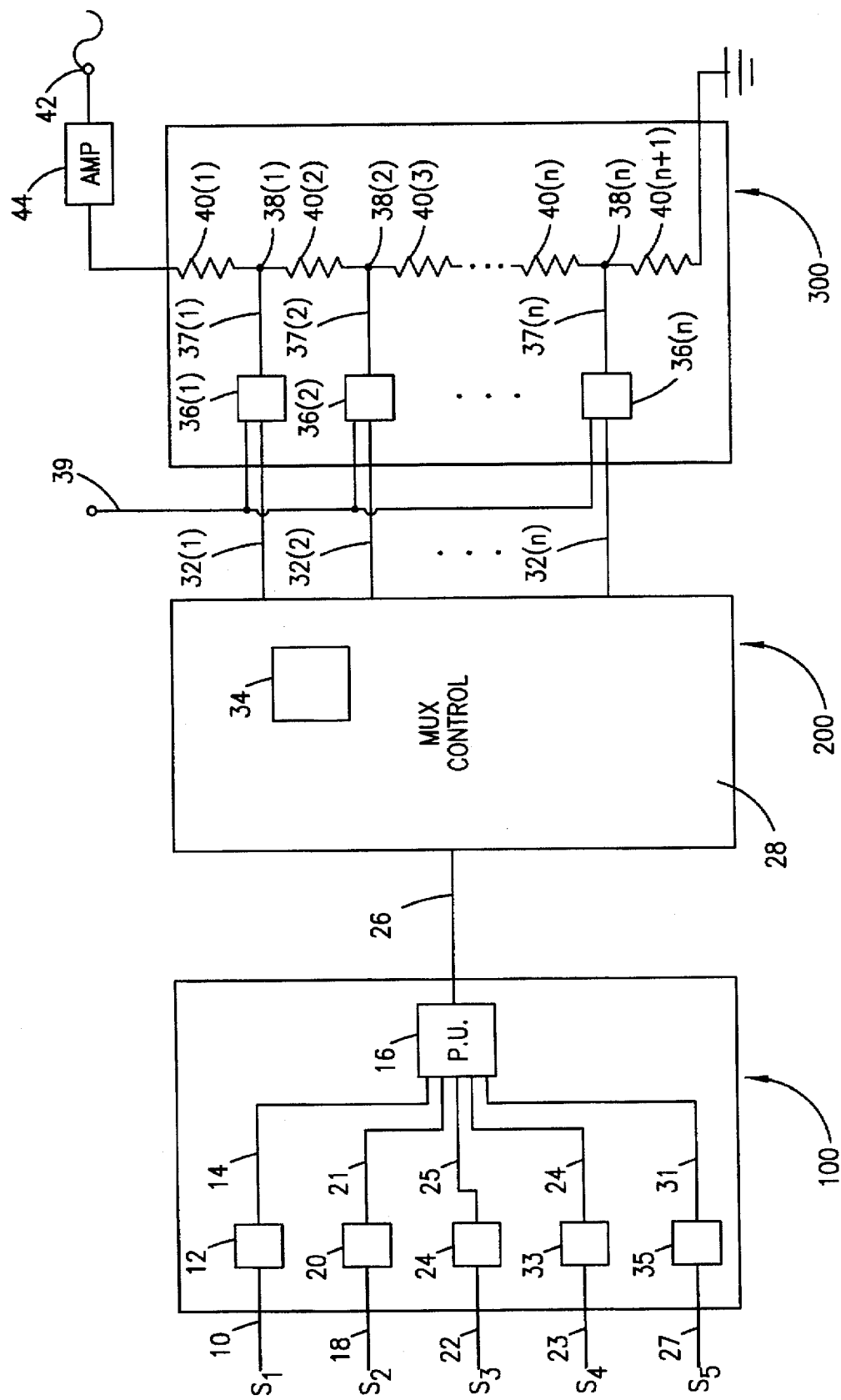
FIG. 1 is a block diagram demonstrating a system overview comprising the invention.

Referring now to FIG. 1 there is shown a block diagram of the system comprising the invention. Depicted in FIG. 1 is a series of blocks all forming a part of a digital potentiometer. As may be seen, block 100, which contains circuitry adapted for communicating with external switches, is connected to block 200 which contains circuitry for controlling the semiconductor gates of block 300 which, in turn, interface with the resistor chain 40(1), 40(2), 40(3) . . . 40(n) of the potentiometer. Thus, a digital potentiometer which is fully capable of being directly connected between external switches and an amplifier is disclosed herein.

More specifically, still referring to FIG. 1, external switches $S_1$, $S_2$, $S_3$, $S_4$ and $S_5$ are connected by lines 10, 18, 22, 23 and 27 to debounce circuits 12, 20, 24, 33 and 35 respectively which are within block 100. The debounce circuits 12, 20, 24, 33 and 35 are conventional debounce circuits which read and interpret the open/close state of external switches $S_1$, $S_2$, $S_3$, $S_4$ and $S_5$ and thereafter produce signals which reflect the state of the external switches $S_1$, $S_2$, $S_3$, $S_4$ and $S_5$ over lines 14, 21, 25, 29, and 31 respectively to a processing unit 16.

Processing unit 16 is adapted for analyzing the external switch selections to determine, for each of a plurality of channels, whether the corresponding resistance of the digital potentiometer should be increased or decreased.

Processing unit 16 contains a circuit for interpreting the state of the external switches and an order of selection. More specifically, processing unit 16 continuously monitors lines 14, 21, 25, 29, and 31 from debounce circuits 12, 20, 24, 33 and 35 to determine for example whether an adjustment is being selected. Additionally, if two or more adjustments are being selected, then processing unit 16 determines which adjustment was selected first and responds to that selection while ignoring the other selections. Once processing unit 16 determines that only one selection is being made, then the processing unit 16 will respond in a normal fashion.

In accordance with a selected interpretation of signal selections received, the processing unit 16 sends commands over line 26 to a multiplexer control or MUX control 28 located in block 200 to activate the multiplexer 200 and to select the resistive value produced by the potentiometer resistor array 40(1), 40(2), 40(3) . . . 40(n) of block 300. The circuit for interpreting the commands of produced by the processing unit 16 may, for example, be digital circuitry or in the form of a microprocessor under software control or a combination thereof.

In one embodiment, processing unit 16 will determine if switch $S_1$, $S_2$, $S_3$ or $S_4$ is being selected, and if more than one switch $S_1$, $S_2$, $S_3$ or $S_4$ is selected, then processing unit 16 will determine which switch was selected first. Accordingly, the processing unit 16 will issue corresponding control commands over line 26 to the MUX control 28.

When the MUX control 28 of block 200 receives a control command over line 26 from processing unit 16, it determines what action should be taken, if any. Accordingly, the multiplexer control will activate one of the plurality of lines 32(1) through 32(n) to select the appropriate wiper position of the potentiometer. In one embodiment, the potentiometer will have for example a resistor array having 64 logarithmic steps. Accordingly, there would be 64 multiplexer control lines, namely 32(1) through 32(64).

Once the multiplexer 28 activates a wiper position control line 32(1)-32(n) to produce the desired resistance value in the resistor array of the potentiometer, the desired volume or change in volume is achieved if such device is being used with an amplifier. It is worth noting that in one embodiment of the invention, the processing unit 16 has the ability to "step" the resistance values from the original wiper selection to the final wiper selection, over a given time period to produce a gradual increase in the desired volume so as to avoid instantaneous change, if the change called for is sufficient to justify or require such stepping. This may be desired so as to prevent to rapid a change in volume, for example.

When the MUX control device 28 activates one of the plurality of lines 32(1)-32(n), a charge pump 34 in Mux Control 28 provides a voltage level adapted for activating a gate device 36(1)-36(n) by supplying a threshold operating voltage. Thus, the gate device 36(1)-36(n) is activated and provides a connection at that wiper point, such as wiper points 38(1), 38(2) ... 38(n), between the amplifier and output line 39. By way of example, if the multiplexer control device 28 activates line 32(2), then charge pump 34 provides a threshold voltage over line 32(2) to gate device 36(2) which in turn establishes a wiper connection over line 37(2) at wiper point 38(2) to output line 39. A further more detailed description of the generalized operation of the digital potentiometer found in a concurrently filed U.S. patent application of Ezell, application Ser. No. 08/497,485, entitled "Logarithm Taper Resistor" for which the full description and operation are incorporated by reference herein. Other improvements to this structure can be found in Ezell, "Zero Crossing Detector" and Ezell, "Stereo Control", both filed concurrently herewith, incorporated by reference herein and bearing application Ser. Nos. 08/497,301 and 08/497,490, respectively.

Figure 2:
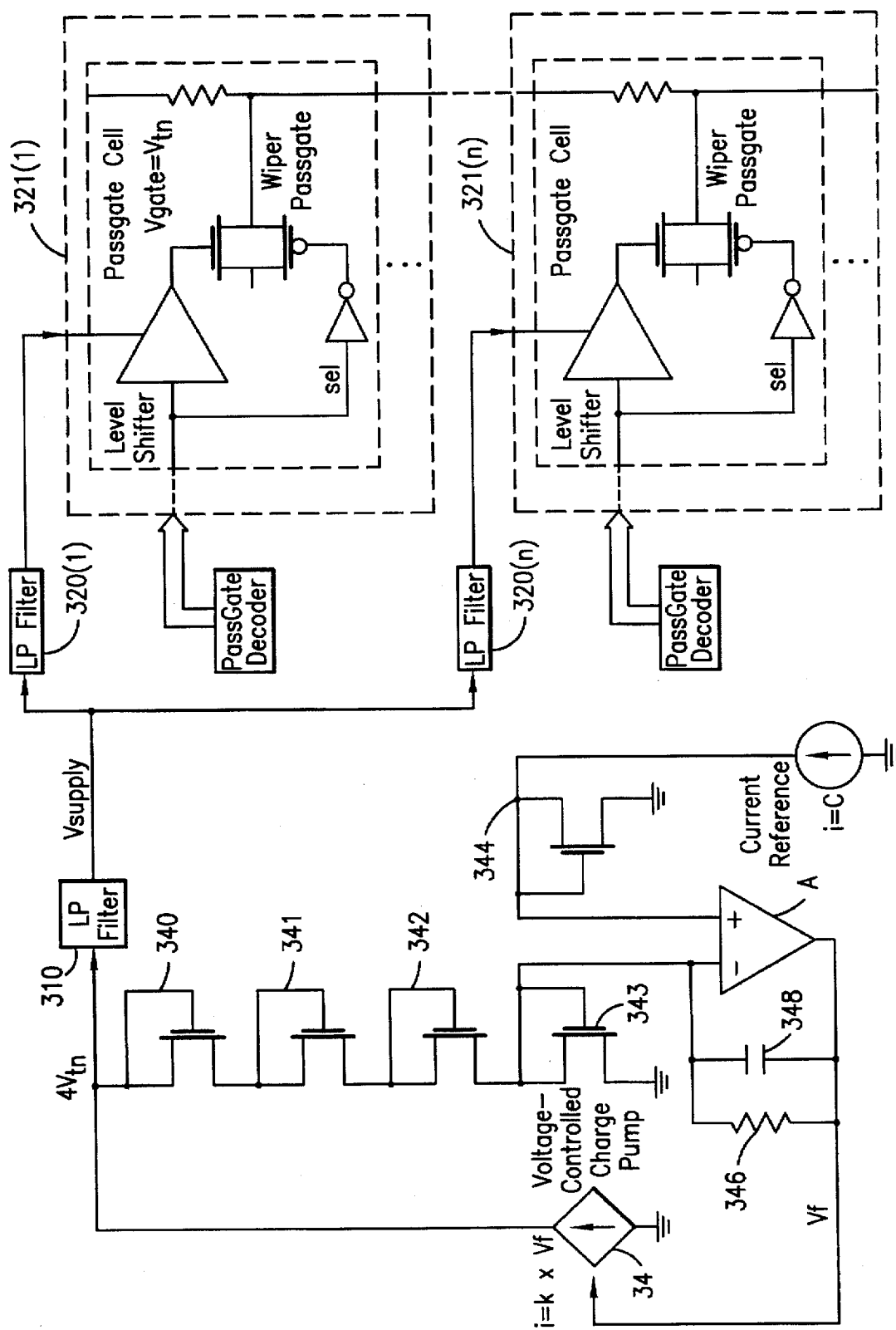
FIG. 2 is a diagram illustrating the charge pump and low pass filters which form one embodiment of the invention.

Referring now to FIG. 2, there is shown one embodiment of the invention herein. Specifically, the voltage-controlled charge pump 34 is connected to the semiconductor gate devices or Passgate Cells 321(1) ... 321(n) which are each connected to a Passgate Decoder or multiplexer, and are used to select the various wiper points 38(1), 38(2) ... 38(n) (see FIG. 1) of a resistor array. As depicted in FIG. 2, each wiper passgate of the corresponding passgate cell 321(n) is a combination N-channel/P-channel CMOS device and is used as a switch to select a wiper tap. However, as may be seen, voltage-controlled charge pump 34 is connected to a low pass filter 310 which, in this embodiment, is comprised of a simple RC circuit or filter, which is in turn connected to a second low pass filter 320(1). It should be noted that the output of the voltage-controlled charge pump 34 goes through low pass filter 310. However, each semiconductor gate device or passgate cell 321(1) ... 321(n) may also have its own low pass filter. In an embodiment herein, each of these low pass filters, 320(1) through 320(n) is a low pass pi-filter. Thus, as may be seen, the current supplied by the voltage-controlled charge pump 34 always flows through low pass filter 310 and then through the low pass filter 320(n) corresponding to the wiper position selected. In another embodiment of this invention, all of the gate devices in one pot can share the second filter 320.

Continuing to examine FIG. 2, it should be noted that the circuitry to the left of the low pass filters 320(1) through 320(n) comprises the voltage bias generating circuit. As may be seen, voltage-controlled charge pump 34, which effectively is a current source, is placed in a feedback loop of a bias generating circuit. Moreover, in this embodiment, the charge pump circuit operates at a frequency of approximately 1 MHZ which is well above the audio frequency spectrum. Specifically, as the audio spectrum generally stops at approximately 20 Khz, the frequency components of any noise is well above that of the human hearing. Accordingly, the great difference in the frequencies provided is sufficient to facilitate an easy filtering of any high frequency components without affecting the audio signal. Therefore, the low pass RC filter 310 and the low pass n-filters 320(n) effectively block all high frequency components and prevent distortion to the audio signal being amplified and transmitted through the digital potentiometer.

In FIG. 2 the voltage-controlled charge pump 34 produces an output current. The voltage-controlled charge pump 34 is provided power which is of a frequency which is produced by the oscillator gateosc 2 600 shown in FIG. 3. This oscillator operates at a frequency of approximately 1 MHZ. The NMOS diode string 340, 341, 342 and 343 produces a voltage 4 $V_m$ which will be four times larger than the voltage produced at the node 344, which is an NMOS threshold voltage, and this voltage 4 $V_m$ is passed to the low pass filter 310. The threshold voltage of each of the N-channel portion of the CMOS wiper passgate will be equal to 1 $V_m$ (or $V_{gate}=V_m$) even with manufacturing variations, since the NMOS gate of the wiper passgate is fabricated on the same wafer as the NMOS diode string 340, 341 and 343.

The amplifier A shown in FIG. 2 is a conventionally designed differential amplifier and in combination with a resistor 346 and the capacitor 348 provide the voltage $V_f$ which is fed to the voltage-controlled charge pump 34. This feedback voltage $V_f$ decreases as the voltage-controlled charge pump 34 increases its output in value which thereby regulates the pump to reduce the total power consumption of the voltage-controlled charge pump. This occurs by using the current reference at the node 344 as one of the differential inputs to the amplifier A and the output of the diode string 340, 341, 342 and 343 as the other input to the differential amplifier A. This controls the level of $V_f$. Accordingly, as $V_f$ decreases the power consumed by the voltage-controlled charge pump 34 obviously decreases.

Figure 3:
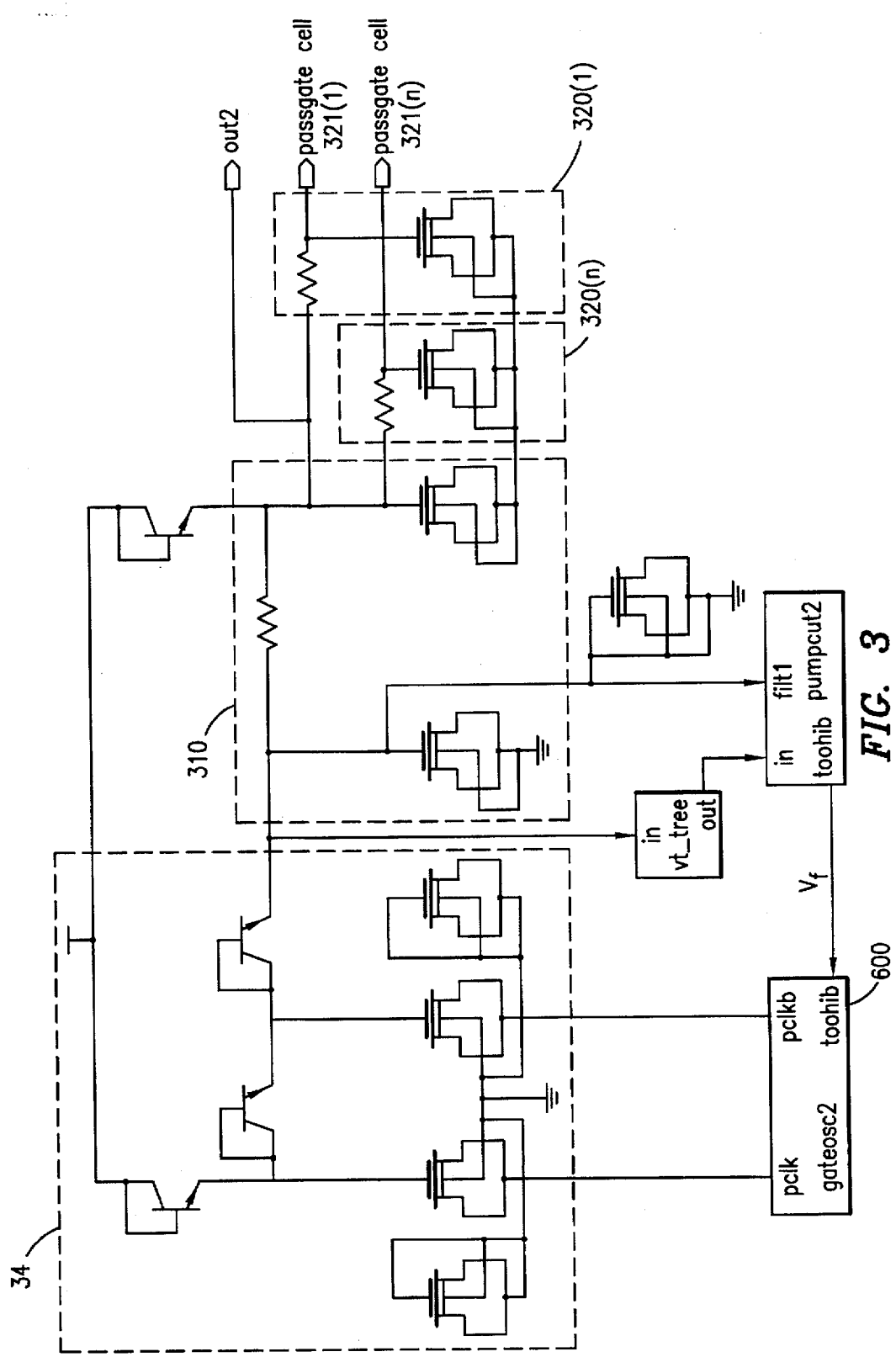
FIG. 3 is a more detailed circuit level diagram of FIG. 2.

The oscillator 600 shown in FIG. 3 is used to drive the charge pump 34 which is shown as a block in FIG. 2 and in more detail in FIG. 3. The NMOS diode string 340, 341, 342 and 343 shown in FIG. 2 are represented in FIG. 3 as block vt_tree. Resistor 346, capacitor 348, amplifier A, Current reference i=C, and the NMOS diode connected to node 344 shown in FIG. 2 are represented in FIG. 3 as pumpcut2. The low pass filters 320(1) through 320(n) are shown in more detail in FIG. 3. The portion of the low pass filter 310 shown FIG. 2 is also shown in more detail in FIG. 3. The workings of the oscillator circuit 600 which drives the voltage-controlled charge pump 34 can be readily understood from looking at FIG. 4 which is a basic low-power oscillator circuit which will operate above the audio frequency range (generally on the order of 1 to 2 MHz).

Figure 4:
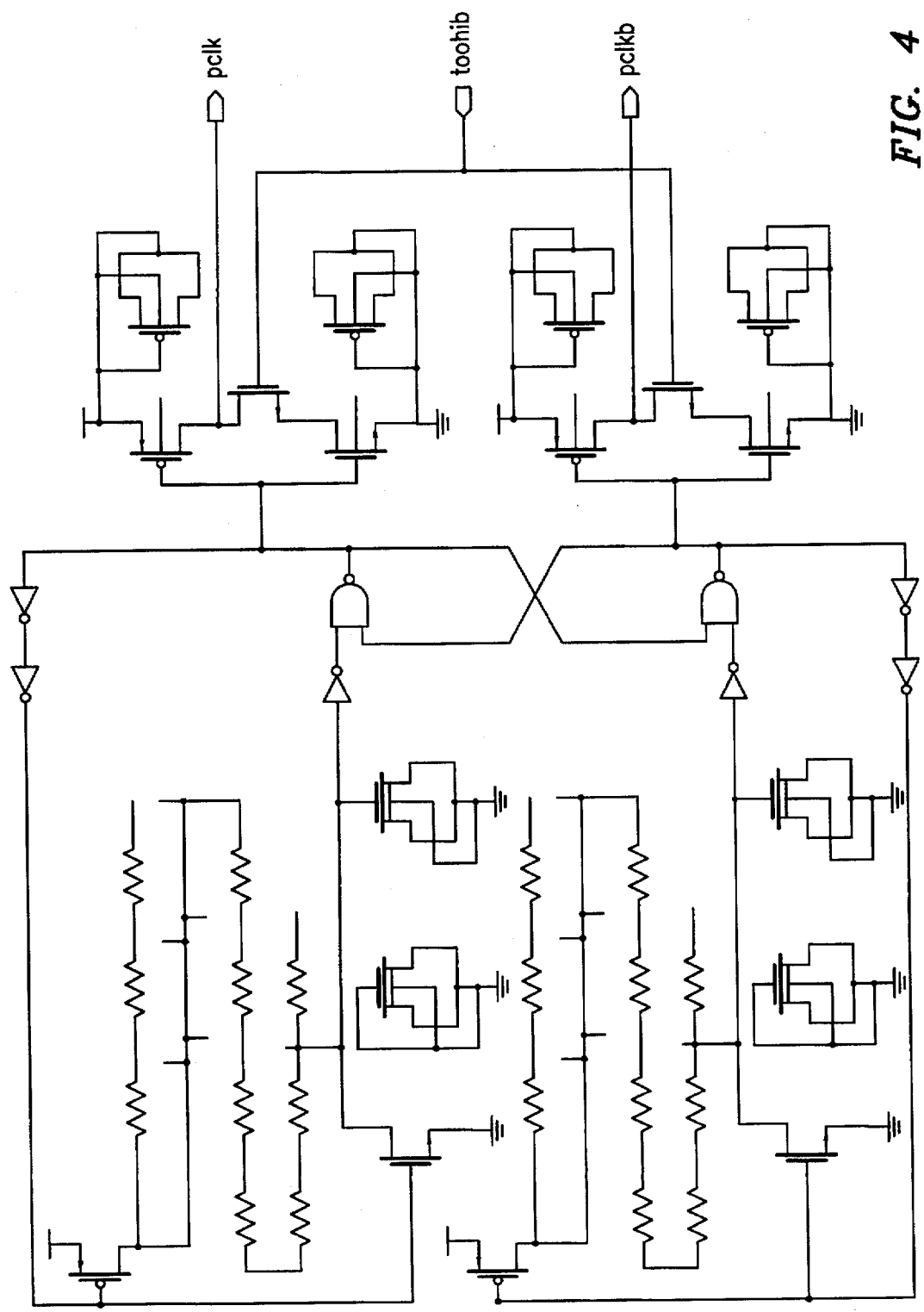
FIG. 4 is a more detailed circuit level diagram of the oscillator circuit of FIG. 3.

As depicted in FIG. 4, the voltage $V_f$ received at input 'toohib' is the voltage applied at the gates of MOSFETs 410 and 412, which determines the amplitude of the oscillating signals generated at nodes 414 and 416. As can be appreciated, the varying of $V_f$ varies the amplitude of the oscillating signals outputted at 'pclk' and 'pclkb'.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A device for providing charge currents for a digital potentiometer, said device comprising:

a voltage generator for generating a voltage signal;

an oscillator circuit coupled to said voltage generator to receive said voltage signal, said oscillator for generating an oscillating signal at a selected frequency, said oscillating signal having an amplitude responsive to said voltage signal;

at least one capacitor coupled to said oscillator circuit to receive said oscillating signal for charging said at least one capacitor; and means, responsive to the charging of said at least one capacitor, for varying the amplitude of said oscillating signal to minimize the power consumption of said device.

2. The device as recited in claim 1, wherein said means for varying the amplitude of said oscillating signal further varies said voltage signal generated by said voltage generator.

3. The device as recited in claim 2, wherein said oscillator circuit generates an oscillating signal having a frequency between approximately one to two megahertz.

4. The device as recited in claim 3, wherein said selected frequency is invariant during operation of said device.

5. A device for providing charge currents, said device comprising:

a voltage generator for generating a voltage signal;

an oscillator coupled to said voltage generator to receive said voltage signal, said oscillator for generating an oscillating signal at a selected frequency, said oscillating signal having an amplitude responsive to said voltage signal;

a charge pump coupled to said oscillator to receive said oscillating signal, said charge pump for generating the charge currents responsive to said oscillating signal; and means, responsive to the charge currents, for varying the amplitude of said oscillating signal to minimize the power consumption of said device.

6. The device as recited in claim 5, wherein said means for varying the amplitude of said oscillating signal further varies said voltage signal generated by said voltage generator.

7. The device as recited in claim 5, wherein said oscillator circuit generates an oscillating signal having a frequency between approximately one to two megahertz.

8. The device as recited in claim 5, and further comprising a filter coupled to said charge pump to receive the charge currents, said filter for filtering out selected components of the charge currents.

9. The device as recited in claim 5, wherein said selected frequency is invariant during operation of said device.

10. A charge control device for selectively applying a charge signal to at least one gate device, said charge control device comprising:

a voltage generator for generating a voltage signal;

an oscillator coupled to said voltage generator to receive said voltage signal, said oscillator for generating an oscillating signal at a selected frequency, said oscillating signal having an amplitude responsive to said voltage signal;

a charge pump coupled to said oscillator to receive said oscillating signal, said charge pump for generating the charge signal responsive to said oscillating signal;

means, responsive to the charge signal, for varying the amplitude of said oscillating signal to minimize the power consumption of said charge control device; and a decoder coupled to said charge pump to receive the charge signal generated by said charge pump, said decoder for controlling selective application of the charge signal to the at least one gate device.

11. The device as recited in claim 10, wherein said oscillator circuit generates an oscillating signal having a frequency between approximately one to two megahertz.

12. The device as recited in claim 10, and further comprising a filter coupled between said charge pump and said decoder, said filter for filtering out selected components of the charge signal.

13. The device as recited in claim 10, wherein said selected frequency is invariant during operation of said device.

14. A device for providing charge currents, said device comprising:

a voltage generator for generating a voltage signal;

an oscillator coupled to said voltage generator to receive said voltage signal, said oscillator for generating an oscillating signal at a selected frequency, said oscillating signal having an amplitude responsive to said voltage signal;

a charge pump coupled to said oscillator to receive said oscillating signal, said charge pump for generating the charge currents responsive to said oscillating signal; and means, responsive to the charge currents, for varying said voltage signal generated by said voltage generator and for varying the amplitude of said oscillating signal, minimizing power consumption of said device.

* * * * *

UNITED STATES PATENT AND TRADEMARK OFFICE
CERTIFICATE OF CORRECTION

PATENT NO. : 5,731,736
DATED : Mar. 24, 1998
INVENTOR(S) : Ezell

It is certified that error appears in the above-identified patent and that said Letters Patent is hereby corrected as shown below:

On the title page, Item [56], under Attorney, Agent, or Firm,
    Replace "Jenkins"
    With "Jenkens"

Column 4, line 38    Replace "341 and 343."
    With --341, 342 and 343.--

Signed and Sealed this

Twentieth Day of July, 1999

Attest:

Q. TODD DICKINSON

*Attesting Officer*    *Acting Commissioner of Patents and Trademarks*